US008780249B2

(12) United States Patent
Matsuda

(10) Patent No.: US 8,780,249 B2
(45) Date of Patent: Jul. 15, 2014

(54) IMAGING DEVICE

(75) Inventor: Hideaki Matsuda, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/452,106

(22) Filed: Apr. 20, 2012

(65) Prior Publication Data

US 2012/0274823 A1 Nov. 1, 2012

(30) Foreign Application Priority Data

Apr. 27, 2011 (JP) ................................ 2011-099652

(51) Int. Cl.
*H04N 3/14* (2006.01)
*H04N 5/335* (2011.01)
*H04N 5/217* (2011.01)
*H04N 9/64* (2006.01)

(52) U.S. Cl.
USPC ............................ 348/308; 348/241; 348/243

(58) Field of Classification Search
USPC ................ 348/296, 302, 308, 340, 241, 243
See application file for complete search history.

(56) References Cited

U.S. PATENT DOCUMENTS

| | | | | |
|---|---|---|---|---|
| 6,801,256 B1* | 10/2004 | Egawa et al. | ................ | 348/294 |
| 2001/0028392 A1* | 10/2001 | Yamamoto et al. | ........... | 348/207 |
| 2002/0113886 A1* | 8/2002 | Hynecek | ...................... | 348/302 |
| 2005/0206762 A1* | 9/2005 | Funakoshi | .................... | 348/296 |
| 2006/0197858 A1 | 9/2006 | Masuyama | | |
| 2007/0206106 A1* | 9/2007 | Kakumoto et al. | ........... | 348/308 |
| 2008/0284884 A1* | 11/2008 | Makino et al. | ................ | 348/296 |
| 2009/0180014 A1* | 7/2009 | Noda et al. | .................... | 348/308 |
| 2009/0316033 A1* | 12/2009 | Uchida | ......................... | 348/308 |
| 2010/0045827 A1* | 2/2010 | Uchida et al. | ................ | 348/241 |
| 2010/0134646 A1* | 6/2010 | Tamura | ..................... | 348/222.1 |

FOREIGN PATENT DOCUMENTS

JP A-2000-125203 4/2000
JP A-2008-288904 11/2008

OTHER PUBLICATIONS

Office Action issued in Japanese Patent Application No. 2011-099652 dated Apr. 16, 2013 (with translation).

* cited by examiner

*Primary Examiner* — Nhan T Tran
*Assistant Examiner* — Xi Wang
(74) *Attorney, Agent, or Firm* — Oliff PLC

(57) ABSTRACT

An imaging device includes a pixel array in which pixels each including a photoelectric conversion part generating and storing a signal charge in accordance with incident light are disposed in a two-dimensional matrix state, and a vertical scanning circuit performing a reset of the photoelectric conversion part by each selected row, and performing a reading of a signal of the pixel by each selected row. During a read period performing the reading, the vertical scanning circuit performs the reset for the photoelectric conversion part at an arbitrary row of which reading ends in accordance with a change of the number of rows to which the resets for the photoelectric conversion parts before exposure are performed to make the number of rows to which the resets of the photoelectric conversion parts are performed constant within the read period of each row.

3 Claims, 11 Drawing Sheets

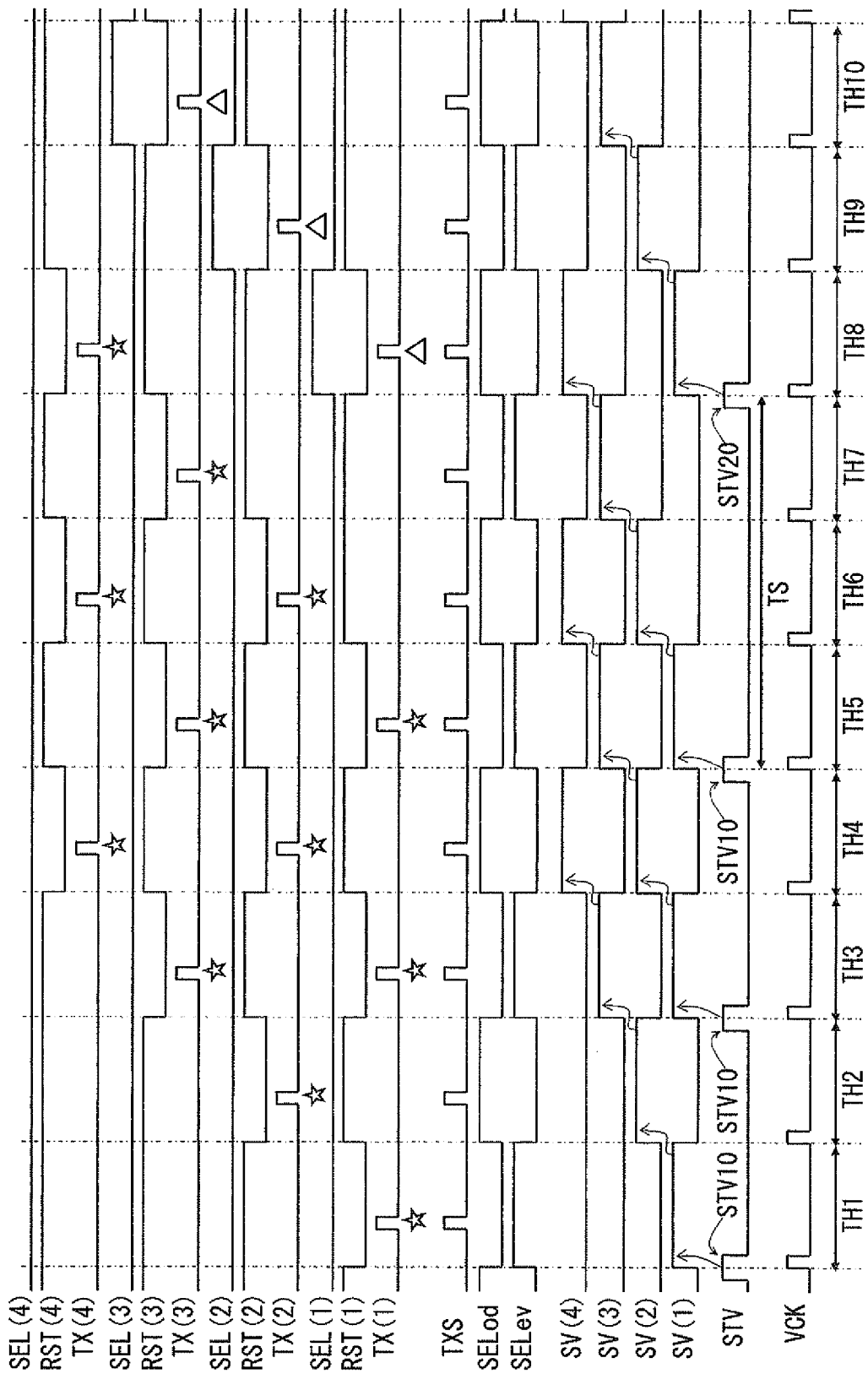

IMAGING DEVICE

CROSS REFERENCE TO RELATED APPLICATION

This application is based upon and claims the benefit of priority from Japanese Patent Application No. 2011-099652, filed on Apr. 27, 2011, the entire contents of which is incorporated herein by reference.

BACKGROUND

1. Field

The present application relates to an imaging device.

2. Description of the Related Art

In recent years, video cameras and digital cameras using a CMOS type imaging device are widely used to the public. The CMOS type imaging device includes a pixel array in which plural pixels are disposed in a two-dimensional matrix state. There are a global shutter method simultaneously performing a shutter operation of one screen and a rolling shutter method performing the shutter operation by each selected row as electronic shutter methods for the CMOS type imaging device. In general, it is often the case that the rolling shutter method is used in the CMOS type imaging device (for example, refer to Japanese Unexamined Patent Application Publication No. 2008-288904).

In the rolling shutter method, the shutter operation including, for example, a reset process resetting a pixel before exposure and a read operation reading a signal from the pixel after exposure are sequentially performed by each selected row. Accordingly, for example, the reset process for a last row ends in a middle of a read period from a start of the read operation of a first row to an end of the read operation of the last row. Namely, the reset process of all rows completes in the middle of the read period.

A supply of pulses for the reset process ends in accordance with the completion of the reset process of all rows, and therefore, a power supply voltage varies. Namely, the power supply voltage varies in the middle of the read period in the rolling shutter method. Note that there is a possibility in which the power supply voltage varies when the number of rows of the reset process performed at the same timing changes because the number of pulses changing at the same timing varies. Noise is generated and an image quality deteriorates caused by the power supply voltage variation. For example, the noise generated by the power supply voltage variation generates a horizontal line pattern (electronic shutter defect) at a photographic screen.

SUMMARY

A proposition of the present invention is to suppress deterioration of image quality of a photographed image in an imaging device in which a rolling shutter method is used.

The imaging device includes a pixel array in which pixels each including a photoelectric conversion part generating and storing a signal charge in accordance with incident light are disposed in a two-dimensional matrix state, and a vertical scanning circuit performing a reset of the photoelectric conversion part by each selected row, and performing a reading of a signal of the pixel by each selected row. During a read period performing the reading, the vertical scanning circuit performs the reset for the photoelectric conversion part at an arbitrary row of which reading ends in accordance with a change of the number of rows to which the resets for the photoelectric conversion parts before exposure are performed to make the number of rows to which the resets of the photoelectric conversion part are performed constant within the read period of each row.

BRIEF DESCRIPTION OF THE DRAWINGS

FIG. 11 illustrates an example of driving timings of the imaging device including the vertical scanning circuit illustrate in FIG. 10.

DETAILED DESCRIPTION OF THE EMBODIMENTS

Hereinafter, embodiments of the present invention are described by using the drawings.

Figure 1:
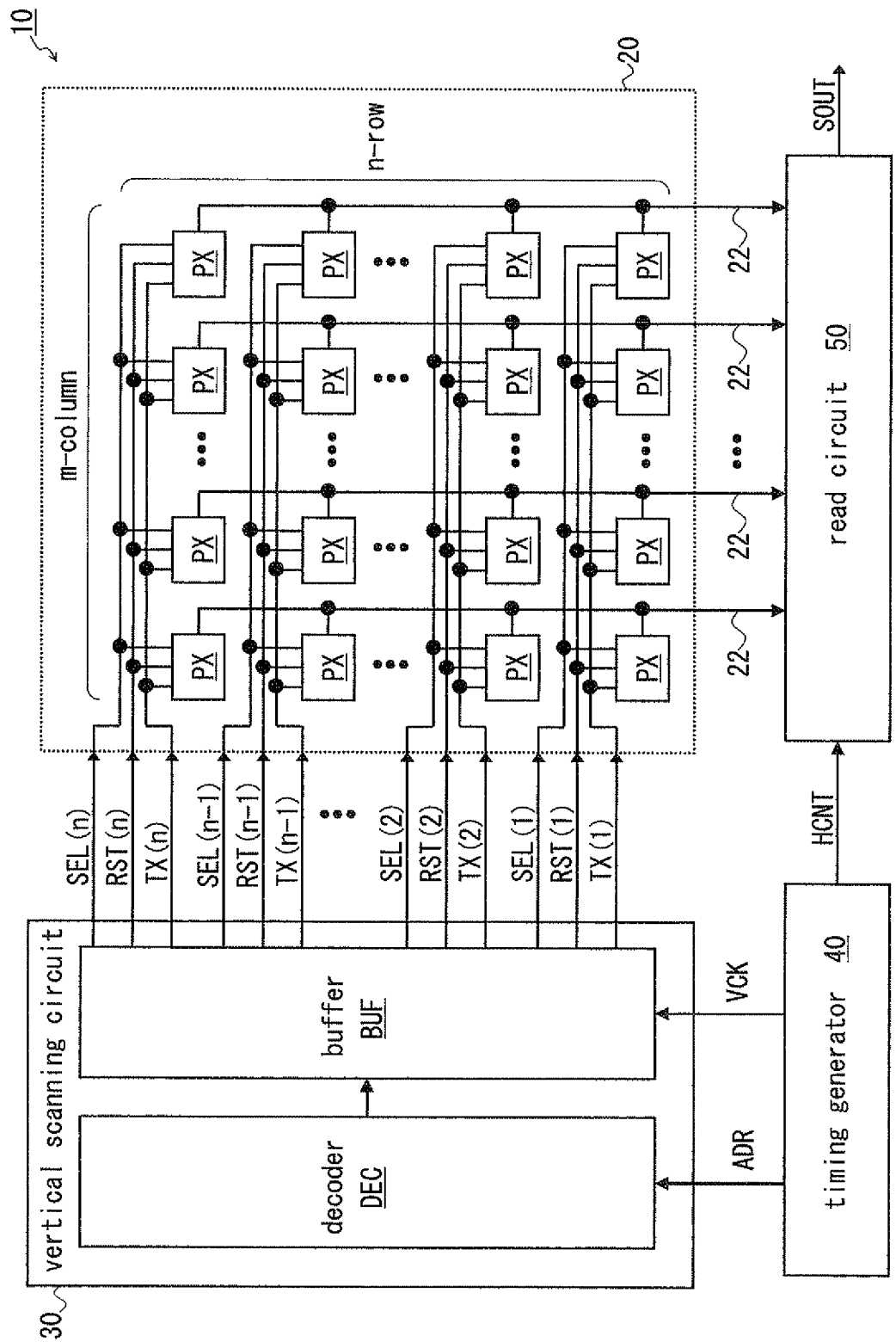
FIG. 1 is a view illustrating a summary of an imaging device in an embodiment.

FIG. 1 illustrates an embodiment of the present invention. An imaging device 10 of this embodiment is a CMOS type imaging device photographing a subject image by means of, for example, a rolling shutter method, and is mounted on a digital camera. The imaging device 10 includes, for example, a pixel array 20, vertical signal lines 22, a vertical scanning circuit 30, a timing generator 40 and a read circuit 50.

The pixel array 20 includes plural pixels PX disposed in a two-dimensional matrix state of n-row m-column. For example, color filters in red, green, blue (not-illustrated) are disposed at an imaging area of the pixel array 20 in a Bayer array. Each pixel PX generates an electric signal in accordance with an amount of light incident via the color filter.

Note that edge parts of the pixel array 20 (for example, the edge parts at an upper side, a lower side, a right side and a left side) are, for example, optical black regions which are light-shielded to calculate a black level. Accordingly, the pixel PX at the edge part of the pixel array 20 is disposed at the optical black region. Plural pixels PX disposed in a column direction (a vertical direction in the drawing) are coupled to the vertical signal line 22 provided by each column. Besides, a constant current source (not-illustrated) is coupled to each vertical signal line 22 to read a signal from each pixel PX.

The vertical scanning circuit 30 receives a driving clock VCK and an address signal ADR from the timing generator 40, and generates control signals SEL, RST, TX to control the pixel PX of the pixel array 20. The address signal ADR is, for example, a signal indicating a drive object row. For example, the vertical scanning circuit 30 includes a decoder DEC and a buffer BUF. The decoder DEC selects a row to be driven based on, for example, the address signal ADR received from the timing generator 40.

Information representing the drive object row selected by the decoder DEC is temporary stored at the buffer BUF. The vertical scanning circuit 30 outputs the control signals SEL, RST, TX of the drive object row indicated by the information stored at the buffer BUF to the pixel array 20 in synchronization with the driving clock VCK received from the timing generator 40.

Besides, the decoder DEC sequentially receives the address signals ADR and sequentially selects the drive object rows within, for example, a cycle of the driving clock VCK when plural rows are simultaneously driven. The buffer BUF sequentially stores the information indicating the drive object rows selected by the decoder DEC. The information indicating the plural rows (drive object rows) is thereby stored at the buffer BUF. The vertical scanning circuit 30 outputs the control signals SEL, RST, TX of the plural rows (drive object rows) represented by the information stored at the buffer BUF within the cycle of the driving clock VCK to the pixel array 20 in synchronization with the driving clock VCK.

Here, the control signal SEL is a selection signal to output a signal of the pixel PX to the vertical signal line 22. The control signal RST is a reset signal to reset a photoelectric conversion part (for example, a photodiode PD illustrated in FIG. 2) and a floating diffusion region (for example, a floating diffusion FD illustrated in FIG. 2) in the pixel PX. The control signal TX is a transfer signal to transfer a signal charge of the photoelectric conversion part to the floating diffusion region.

Namely, the vertical scanning circuit 30 controls the pixels PX of the pixel array 20 by each row by using the control signals SEL, RST, TX. For example, the vertical scanning circuit 30 controls the pixel PX at a first row by using control signals SEL (1), RST (1), TX (1). Note that hereinafter, the control signal SEL may also be called as a selection signal SEL, the control signal RST may also be called as a reset signal RST, and the control signal TX may also be called as a transfer signal TX.

The timing generator 40 controls operations of the vertical scanning circuit 30 and the read circuit 50. For example, the timing generator 40 generates the address signal ADR indicating the drive object row, and outputs the generated address signal ADR to the vertical scanning circuit 30. Note that the timing generator 40 may be integrally formed on a substrate where the pixel array 20 and peripheral circuits such as the vertical scanning circuit 30 are formed, and may be provided at a substrate and so on different from the substrate where the pixel array 20 and so on are formed.

The read circuit 50 outputs a signal SOUT of a photographed image based on, for example, a control signal HCNT received from the timing generator 40. For example, the read circuit 50 sequentially outputs the signals of the pixels PX at the row selected by the vertical scanning circuit 30 by each column.

Figure 2:
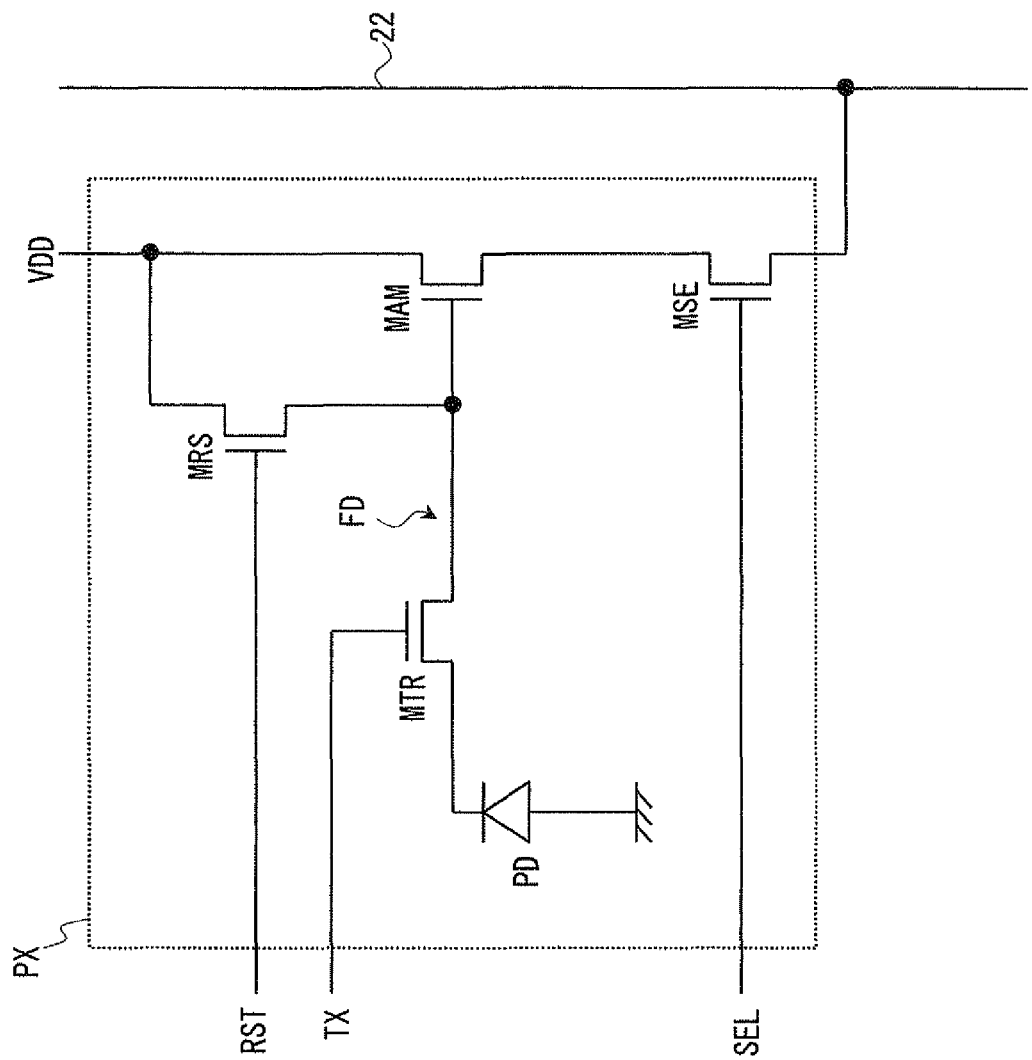
FIG. 2 is a view illustrating an example of a pixel illustrated in FIG. 1.

FIG. 2 illustrates an example of the pixel PX illustrated in FIG. 1. The pixel PX includes the photodiode PD as the photoelectric conversion part, a transfer transistor MTR, an amplifying transistor MAM, a pixel selection transistor MSE, a reset transistor MRS and the floating diffusion ED (floating diffusion region). Note that in this embodiment, all of the transistors MTR, MAM, MSE, MRS formed in the pixel PX are, for example, nMOS transistors. Besides, the floating diffusion FD is a region where a storage capacitance storing the signal charge transferred from the photodiode PD is formed (a drain region of the transistor MRT, a wiring region between the transistors MTR and MAM, a gate region of the transistor MAM, a source region of the reset transistor MRS, and so on).

The photodiode PD is the photoelectric conversion part generating and storing a signal charge in accordance with incident light, and in which an anode is grounded, and a cathode is coupled to a source of the transfer transistor MTR.

The transfer transistor MTR is turned on during a period when the transfer signal TX applied to a gate is at high-level, and transfers the signal charge stored at the photodiode PD to the floating diffusion FD.

In the amplifying transistor MAM, a source is coupled to a drain of the pixel selection transistor MSE, a drain is coupled to a power supply VDD, and a gate is coupled to a drain of the transfer transistor MTR. Namely, a voltage in accordance with the signal charge transferred to the floating diffusion FD is input to the gate of the amplifying transistor MAM. The amplifying transistor MAM outputs, for example, a voltage descending for a threshold voltage of the amplifying transistor MAM from a gate voltage, from the source. As stated above, the amplifying transistor MAM generates a signal in accordance with the signal charge transferred to the floating diffusion FD.

The pixel selection transistor MSE is turned on during a period when the selection signal SEL applied to a gate is at high-level, and conducts between the vertical signal line 22 coupled to a source and the source of the amplifying transistor MAM. Accordingly, a source follower circuit is made up by the amplifying transistor MAM, the pixel selection transistor MSE, and the constant current source coupled to the vertical signal line 22 during a period when the pixel selection transistor MSE is turned on. The signal of the pixel PX selected by the pixel selection transistor MSE is thereby output to the vertical signal line 22.

In the reset transistor MRS, a source is coupled to the gate of the amplifying transistor MAM, a drain is coupled to the power supply VDD. The reset transistor MRS is turned on during a period when the reset signal RST applied to a gate is at high-level, and resets the signal charge of the floating diffusion FD.

Figure 3:
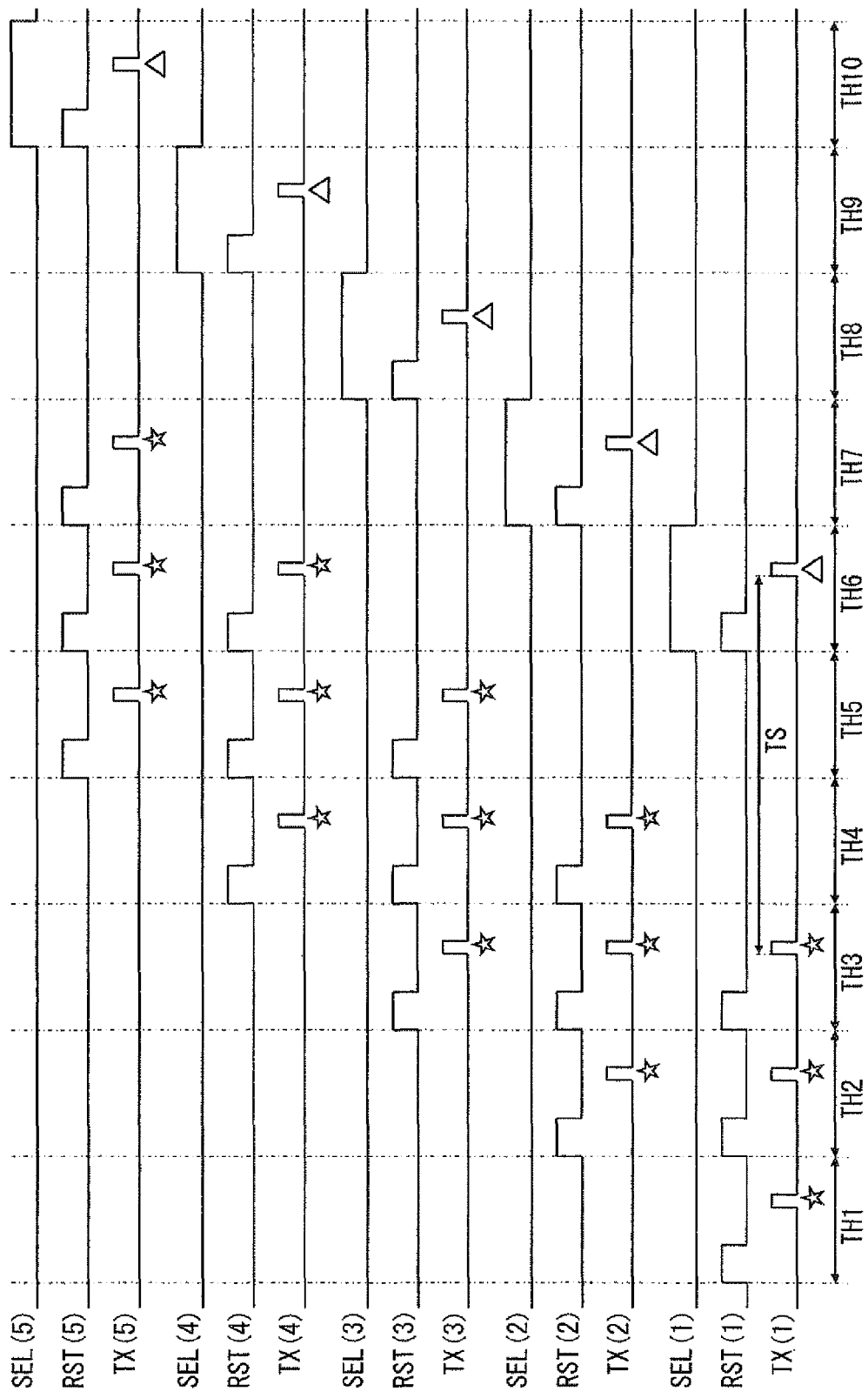
FIG. 3 is a view illustrating an example of driving timings of the pixel illustrated in FIG. 1.

FIG. 3 illustrates an example of driving timings of the pixel PX illustrated in FIG. 1. Note that FIG. 3 illustrates the example of the driving timings of the pixel PX when the photodiode PD of the pixel PX is reset for three times before exposure. Star signs in the drawing represent that the control signals SEL, RST, TX to reset the photodiode PD are generated, and triangles represent that the control signals SEL, RST, TX to read the signal from the pixel PX are generated. Namely, the star sign in the drawing represents that the photodiode PD is reset, and the triangle represents that the signal is read from the pixel PX. Besides, periods TH (TH1 to TH10) are the same lengths with each other, and for example, it is the same length as a horizontal period to sequentially read the signal SOUT for one row from the pixel PX. Hereinafter, the period TH is also called as a horizontal period TH.

At the horizontal period TH1, at first, the reset signal RST (1) changes from low-level to high-level. The reset transistor MRS is thereby turned on and the voltage of the floating diffusion FD is reset in the pixel PX at the first row. After a certain period elapses, the reset signal RST (1) changes from high-level to low-level. After the reset signal RST (1) changes from high-level to low-level, the transfer signal TX (1) changes from low-level to high-level. After a certain period elapses, the transfer signal TX (1) changes from high-level to low-level. The transfer transistor MTR is thereby turned on for a certain period, and the signal charge stored at the photodiode PD is transferred to the floating diffusion FD in the pixel PX at the first row.

The photodiode PD of the pixel PX at the first row is thereby reset at the horizontal period TH1. Note that the selection signal SEL (1) is kept at low-level at the horizontal period TH1, and therefore, the signal charge transferred to the floating diffusion FD is not read to the vertical signal line 22. Hereinafter, the reset of the photodiode PD is also called as a pixel reset.

At the horizontal period TH2, the pixel resets for the pixels PX at the first and second rows are performed. For example, control signals SEL (1), RST (1), TX (1), SEL (2), RST (2), TX (2) are controlled as same as the control signals SEL (1), RST (1), TX (1) at the horizontal period TH1. The second reset for the photodiode PD of the pixel PX at the first row is thereby performed, and the first reset for the photodiode PD of the pixel PX at the second row is performed.

At the horizontal period TH3, the pixel resets for the pixels PX at the first, second, and third rows are performed. For example, control signals SEL (1), RST (1), TX (1), SEL (2), RST (2), TX (2), SEL (3), RST (3), TX (3) are controlled as same as the control signals SEL (1), RST (1), TX (1) at the horizontal period TH1. Thereby, the third, second, and first resets are respectively performed for the photodiodes PD of the pixels PX at the first, second, and third rows. Note that the exposure for the photodiode PD starts after the resets of the photodiode PD are performed for three times in the pixel PX at the first row.

At the horizontal period TH4, the pixel resets for the pixels PX at the second, third, and fourth rows are performed. Note that at the horizontal period TH4, the control signals SEL (1), RST (1), TX (1) are kept at low-level, and therefore, the photodiode PD of the pixel PX at the first row is exposed. Besides, the exposure for the photodiode PD starts after the resets of the photodiode PD are performed for three times in the pixel PX at the second row. As stated above, the pixel resets resetting the pixels PX before exposure are sequentially performed by each row. For example, the row where the pixel reset is performed sequentially shifts by each horizontal period TH until the third pixel reset is performed for the pixel PX at the last row (for example, at an n-th row illustrated in FIG. 1).

At the horizontal period TH5, the pixel resets for the pixels PX at the third, fourth and fifth rows are performed. The exposure for the photodiode PD of the pixel PX at the third row starts.

At the horizontal period TH6, the pixel resets for the pixels PX at the fourth, fifth and sixth rows are performed. The exposure for the photodiode PD of the pixel PX at the fourth row starts. Besides, at the horizontal period TH6, a signal is read from the pixel PX at the first row exposed for a predetermined time (exposure time TS). For example, at the horizontal period TH6, the selection signal SEL (1) is kept at high-level. A signal corresponding to a voltage of the floating diffusion FD is thereby read to the vertical signal line 22. Note that the floating diffusion FD is reset before the signal charge stored at the photodiode PD is transferred to the floating diffusion FD in the pixel PX at the first row of which signal is read.

Accordingly, at the horizontal period TH6, at first, the reset signal RST (1) changes from low-level to high-level. The reset transistor MRS is thereby turned on, and the voltage of the floating diffusion FD is reset in the pixel PX at the first row. Then the reset signal RST (1) changes from high-level to low-level after a certain period elapses.

After the reset signal RST (1) changes from high-level to low-level, the transfer signal TX (1) changes from low-level to high-level. After a certain period elapses, the transfer signal TX (1) changes from high-level to low level. The transfer transistor MTR is thereby turned on for a certain period, and the signal charge stored at the photodiode PD by the exposure is transferred to the floating diffusion FD in the pixel PX at the first row. Namely, the signal charge in accordance with the incident light is transferred from the photodiode PD to the floating diffusion FD.

Note that the selection signal SEL (1) is kept at high-level at the horizontal period TH6, and therefore, the signal corresponding to the signal charge transferred to the floating diffusion FD is read to the vertical signal line 22 via the amplifying transistor MAM and the pixel selection transistor MSE. Hereinafter, the control to read the signal from the pixel PX is also called as a read operation. For example, in this embodiment, the control signals of the read operation are the same as the control signals of the pixel reset except that the selection signal SEL is at high-level.

At the horizontal period TH7, the pixel resets for the pixels PX at the fifth, sixth and seventh rows are performed. The read operation for the pixel PX at the second row is performed. For example, the control signals SEL (2), RST (2), TX (2) are controlled as same as the control signals SEL (1), RST (1), TX (1) at the horizontal period TH6. The signal is thereby read from the pixel PX at the second row.

As stated above, in this embodiment, the read operation reading the signal from the pixel PX after exposure (the triangle in FIG. 3) and the pixel resets for the pixels PX of three rows (the star sign in FIG. 3) are performed at the same horizontal period TH. Note that the read operations reading the signal from the pixel PX after exposure are sequentially performed by each row. For example, the row where the read operation is performed sequentially shifts by each horizontal period TH until the signal is read from the pixel PX at the last row (for example, at the n-th row illustrated in FIG. 1).

Figure 4:
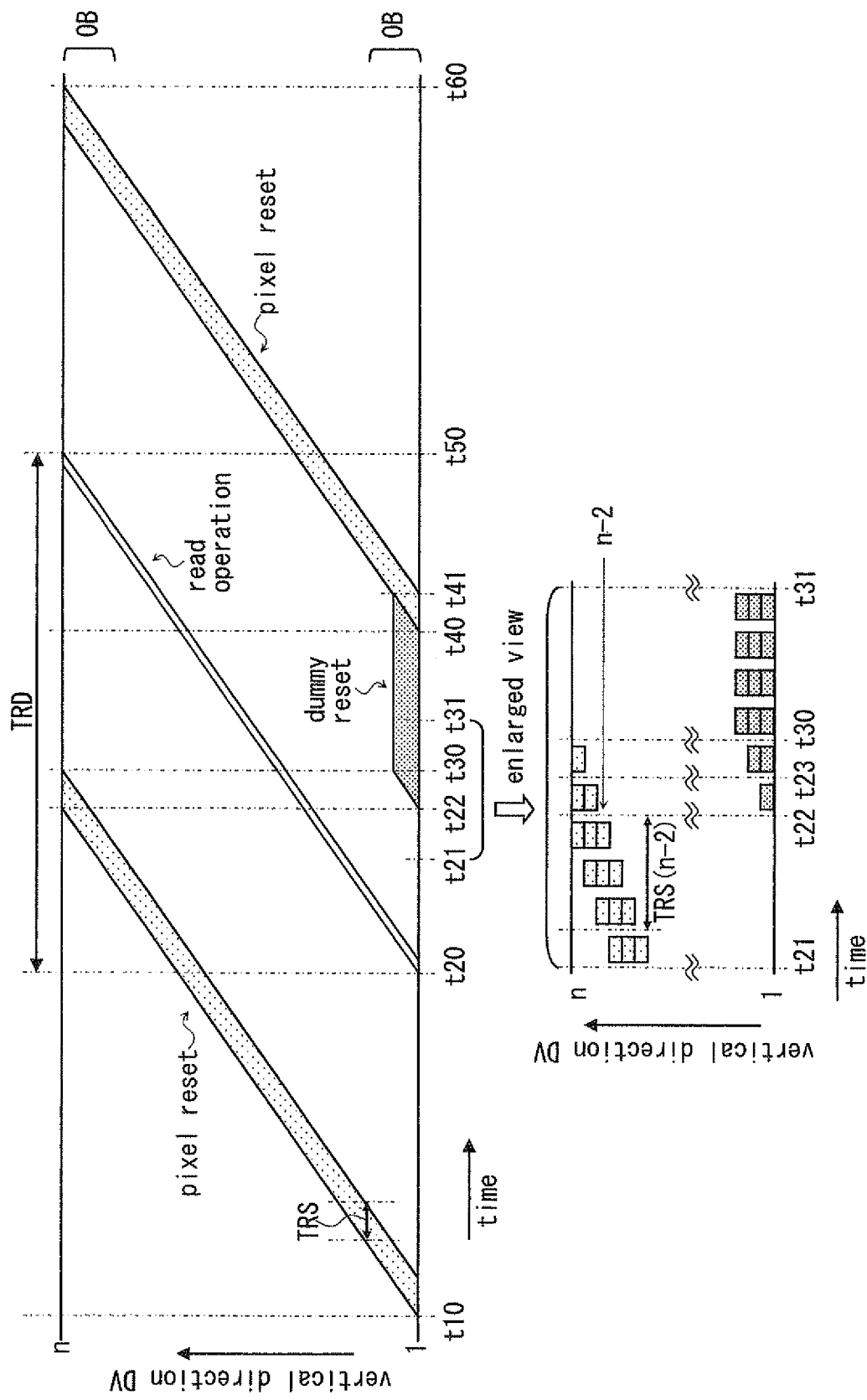
FIG. 4 is a view illustrating an example of operations of the imaging device illustrated in FIG. 1.

FIG. 4 illustrates an example of operations of the imaging device 10 illustrated in FIG. 1. Note that FIG. 4 illustrates a summary of timings when the pixel reset and the read operation of each row in the pixel array 20 are performed. A vertical direction DV in the drawing corresponds, for example, from the first row to the n-th row of the pixel array 20. A half-tone dot meshing in the drawing represents that the pixel reset is performed for the pixel PX. Note that a relatively pale half-tone dot meshing represents the pixel reset for the pixel PX before exposure, and a relatively deep half-tone dot meshing represents a dummy reset.

At first, the pixel resets are sequentially performed from, for example, the first row to the n-th row during a period from a time t10 to a time t30. For example, the pixel resets for three times are performed for the pixel PX before exposure to surely reset the pixel PX in the operations illustrated in FIG. 4. Note that a reset period TRS in the drawing represents a period when the pixel resets for three times are performed. For example, the reset period TRS of the first row corresponds to the horizontal periods TH1, TH2, TH3 illustrated in FIG. 3. Besides, for example, the reset period TRS of the second row corresponds to the horizontal periods TH2, TH3, TH4.

The signal of the pixel PX at the first row is read at a time t20 after the exposure time elapses since the pixel PX at the first row is reset. For example, the read operations are sequentially performed from the first row to the n-th row during a read period TRD from the time t20 to a time t50. A first photographed image is thereby read. The pixel resets for a second photographing are sequentially performed from, for example, the first row to the n-th row during a period from a time t40 to a time t60.

Besides, the dummy reset is performed for the pixel at an arbitrary row of which read operation ends during a period from a time t22 to a time t41 in a middle of the read period TRD. The dummy reset is, for example, the pixel reset. For example, the dummy reset is performed for a row of the optical black region OR of which read operation ends to make the number of rows to which the pixel resets are performed constant within a period of the read operation of each row.

The dummy reset is described by using an enlarged view from a time t21 to the time t31. Note that a description of the read operation is not given for easy to see the drawing in the enlarged view. For example, the signals are read from all pixels PX of the pixel array 20 by the read operations sequentially performed by each row. Besides, a reset period TRS (n−2) in the enlarged view represents a reset period TRS at an "n−2"-th row.

The pixel resets are performed for three times for the pixel PX before exposure, and therefore, for example, the pixel resets for the pixels PX before exposure are performed every three rows until the third pixel reset is performed for the pixel PX at the "n−2"-th row (before a time t22). Namely, the pixel resets for the pixels PX before exposure are performed by every three rows until the first pixel reset for the pixel PX at the n-th row is performed (before the time t22). Note that the pixel resets for the pixels PX before exposure may be sequentially performed every three rows made up by three rows on every other row. In this case, for example, the pixel resets are performed at rows including red and at rows including blue alternately in the Bayer array.

When the second pixel reset is performed for the pixel PX at the n-th row (a period from the time t22 to a time t23), the pixel reset for the pixel PX at the "n−2"-th row ends, and therefore, the pixel resets for the pixels PX before exposure are performed for two rows of the nth row and the "n−1"-th row. The dummy reset (pixel reset) is therefore performed for the pixel PX at the first row of which read operation ends. Accordingly, the pixel resets are performed for the pixels PX of three rows (the first row, the "n−1"-th row, the n-th row) during the period from the time t22 to the time t23.

When the third pixel reset is performed for the pixel PX at the n-th row (a period from the time t23 to the time t30), the pixel reset for the pixel PX at the "n−1"-th row ends, and therefore, the pixel reset for the pixel PX before exposure is performed only for the n-th row. The dummy resets are therefore performed for the pixels PX at the first and second rows of which read operations end. The pixel resets are performed for the pixels PX of three rows (the first row, the second row, the n-th row) during the period from the time t23 to the time t30.

For example, the pixel resets for the pixels PX before exposure end at all rows, and therefore, the dummy resets are performed for the pixels PX at the first, second, and third rows of which read operations end during the period from the time t30 to the time t31. The pixel resets are thereby performed for the pixels PX of three rows (the first row, the second row, the third row) during the period from the time t30 to the time t31. As stated above, the number of rows to which the dummy resets are performed increases in accordance with a decrease in the number of rows to which the pixel resets are performed for the pixels PX before exposure.

After the time t31, the dummy resets are performed for the pixels PX at the first, second and third rows until the time t40 when the pixel reset for the second photographing is performed. The number of rows to which the dummy resets are performed decreases in accordance with an increase in the number of rows to which the pixel resets are performed for the pixels PX before exposure during a period from the time t40 to the time t41.

For example, when the pixel reset for the second photographing is performed for the pixel PX at the first row, the dummy resets are performed for the pixels PX of two rows (the second row, the third row). When the pixel resets are performed for the pixels PX at the first and second rows, the dummy reset is performed for the pixel PX of one row (the third row). In this embodiment, it is thereby possible to make the number of rows of the pixel resets (the pixel resets including the dummy resets) performed during a read operation period of each row (for example, each horizontal period TH after the horizontal period TH6 or later illustrated in FIG. 3) constant (for example, three rows).

Here, at the second photographing time, the pixel resets including the dummy resets are performed for the pixels PX at the first, second and third rows for four times or more. In the operations illustrated in FIG. 4, the pixel PX is surely reset by the pixel resets for three times, and therefore, there is no difference in an image quality caused by a difference in the number of pixel resets as long as the pixel resets for three times or more are performed. Further, in this embodiment, the dummy resets are performed for the pixels PX at the optical black region OB, and therefore, it is surely possible to prevent that the difference in the image quality occurs caused by the difference in the number of pixel resets.

When the second photographing is not performed continuously, the dummy resets may be performed for the pixels PX of three rows (the first row, the second row, the third row) from the time t30 to the time t50 when the read operations end. In this embodiment, it is thereby possible to make the number of rows of the pixel resets performed during the read operation of each row constant (for example, three rows).

Namely, in this embodiment, the dummy reset is performed for the pixel PX at an arbitrary row of which read operation ends in accordance with a change in the number of rows to which the pixel resets for the pixels PX before exposure are performed, to make the number of rows to which the pixel resets are performed constant during all periods (horizontal periods TH illustrated in FIG. 3) when the read operations are performed. Thereby, the number of rows to which either the dummy resets or the pixel resets for the pixels PX before exposure are performed is, for example, constantly three rows at each period (each horizontal period TH) when the read operation is performed.

Accordingly, it is possible to prevent that the number of rows to which the pixel resets are performed varies in the middle of the read period TRD from, for example, the start of the read operation of the first row to the end of the read operation of the last row in this embodiment. It is thereby possible to prevent that the power supply voltage varies in the middle of the read period TRD, and to prevent the generation of noise caused by the power supply voltage variation in this embodiment. Here, for example, the noise generated by the power supply voltage variation generates the horizontal line pattern (electronic shutter defect) at a photographic screen. Note that it is possible to suppress the electronic shutter defect because the generation of noise caused by the power supply voltage variation can be prevented in this embodiment. Namely, it is possible to suppress deterioration of the image quality of the photographed image in this embodiment.

Figure 5:
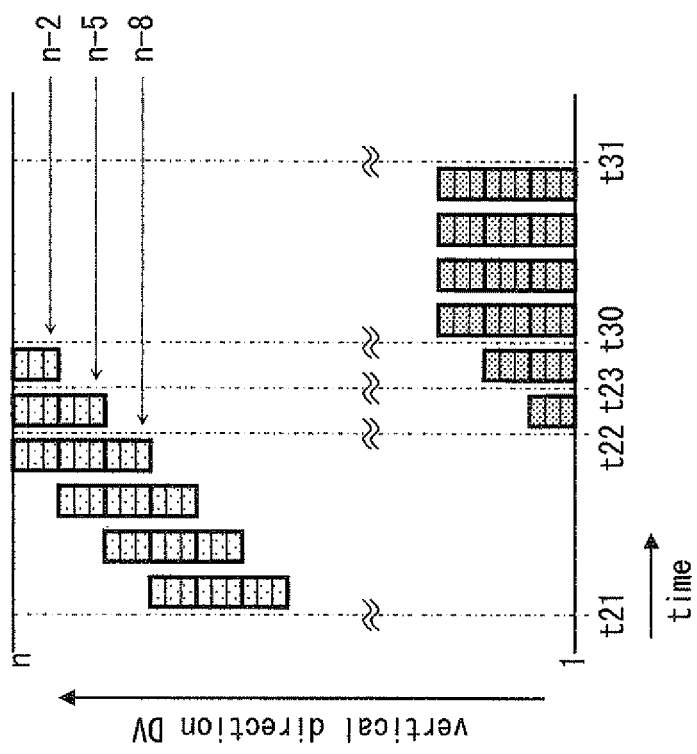
FIG. 5 is a view illustrating another example of the operations of the imaging device illustrated in FIG. 1.

FIG. 5 illustrates another example of operations of the imaging device 10 illustrated in FIG. 1. Note that FIG. 5 illustrates a summary of the pixel resets when a 1/3 thinning-out reading is performed. Besides, FIG. 5 corresponds to the enlarged view from the time t21 to the time t31 illustrated in FIG. 4, and the description of the read operation is not given for easy to see the drawing. For example, in the 1/3 thinning-out reading, a signal is read from a pixel PX at a "3×i−1"-th row (i=1, 2, 3, . . . ). A relatively pale half-tone dot meshing in the drawing represents the pixel reset for the pixel PX before exposure, and a relatively deep half-tone dot meshing represents the dummy reset. Besides, a center row within a pale half-tone dot meshing area surrounded by a heavy line corresponds to a read object row. The pixel reset is also performed for a row adjacent to the read object row in this embodiment. It is thereby possible to prevent that the signal charge of the pixel PX at a skipped row leaks into the pixel PX at a row to be read (blooming) in this embodiment.

In the operations illustrated in FIG. 5, for example, the pixel resets are performed for three times for the pixel PX before exposure to surely reset the pixel PX. Accordingly, the pixel resets for the pixels PX before exposure are performed for three rows being the read object and six rows which are skipped. For example, the pixel resets for the pixels PX before exposure are performed every nine rows until the third pixel reset is performed for the pixel PX at the "n−8"-th row (before the time t22) within the read period (the read period TRD illustrated in FIG. 4). The object rows of the pixel resets for the pixels PX before exposure sequentially shift every three rows. Note that the pixel resets for the pixels PX before exposure may be sequentially performed every nine rows made up by nine rows on every other row.

When the second pixel reset is performed for the pixel PX at the "n−1"-th row (a period from the time t22 to the time t23), the pixel resets for the pixels PX from the "n−8"-th row to the "n−6"-th row end, and therefore, the pixel resets for the pixels PX before exposure are performed for six rows from the "n−5"-th row to the n-th row. Accordingly, the dummy resets (pixel resets) are performed for the pixels PX from the first row to the third row of which read operations end. The pixel resets are thereby performed for the pixels PX of nine rows (from the first row to the third row, from the "n−5"-th row to the n-th row) during the period from the time t22 to the time t23.

When the third pixel reset for the pixel PX at the "n−1"-th row is performed (a period from the time t23 to the time t30), the pixel resets for the pixels PX before exposure are performed for three rows from the "n−2"-th row to the n-th row because the pixel resets for the pixels PX from the "n−5"-th row to the "n−3"-th row end. Accordingly, the dummy resets are performed for the pixels PX from the first row to the sixth row of which read operations end. The pixel resets are performed for the pixels PX of nine rows (from the first row to the sixth row, from the "n−2"-th row to the n-th row) during the period from the time t23 to the time t30.

For example, the pixel resets for the pixels PX before exposure end for all rows during the period from the time t30 to the time t31, and therefore, the dummy resets are performed for the pixels PX at the first row to the ninth row of which read operations end. The pixel resets are performed for the pixels PX of nine rows (from the first row to the ninth row) during the period from the time t30 to the time t31. As stated above, the number of rows to which the dummy resets are performed increases in accordance with the decrease in the number of rows to which the pixel resets for the pixels PX before exposure are performed.

After the time t31, the dummy resets are performed for the pixels PX from the first row to the ninth row until the time when the pixel reset for the second photographing is performed (for example, the time t40 in FIG. 4). After the time when the pixel reset for the second photographing is performed, the number of rows to which the dummy resets are performed decreases in accordance with the increase in the number of rows to which the pixel resets are performed for the pixels PX before exposure.

For example, when the pixel resets for the second photographing are performed for the pixels PX from the first row to the third row, the dummy resets are performed for the pixels PX of six rows (from the fourth row to the ninth row). When the pixel resets are performed for the pixels PX from the first row to the sixth row, the dummy resets are performed for the pixels PX of three rows (from the sixth row to the ninth row). It is thereby possible to make the number of rows of the pixel resets performed during the read operation of each row constant (for example, nine rows) in this embodiment.

Note that when the second photographing is not performed continuously, the dummy resets may be performed for the pixels PX of nine rows (from the first row to the ninth row) from the time t30 to the time when the read operations end (for example, the time t50 illustrated in FIG. 4). It is thereby possible to make the number of rows of the pixel resets performed during the read operation period of each row constant (for example, nine rows) in this embodiment.

Namely, it is possible to make the number of rows of the pixel resets performed during the read operation period of each row constant (for example, nine rows) even when the thinning-out reading is performed in this embodiment. Note that the control of the dummy resets and the control of the pixel resets for the pixels PX before exposure are the same as FIG. 5 even when an image signal is generated by mixing three pixels PX in a vertical direction (vertical three pixel mixing). Besides, the control of the dummy resets and the control of the pixel resets for the pixels PX before exposure are basically the same as FIG. 5 except the number of rows of the pixel resets performed simultaneously even when a thinning-out reading and so on other than the 1/3 thinning-out reading is performed. Note that the pixel resets may be performed either only for the read object row and the row adjacent to the read object row or for all rows, in the thinning-out reading.

Figure 6:
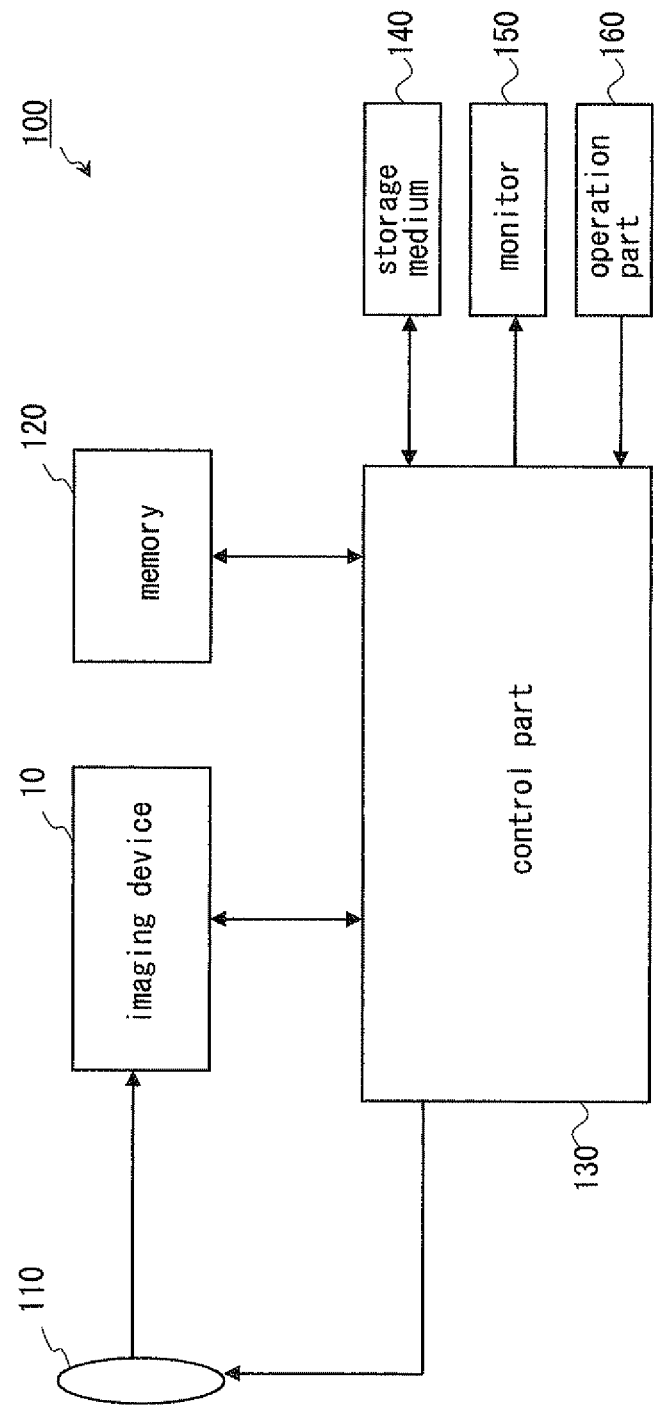
FIG. 6 is a view illustrating an example of a camera made up by using the imaging device illustrated in FIG. 1.

FIG. 6 illustrates an example of a camera made up by using the imaging device 10 illustrated in FIG. 1. A camera 100 is, for example, a digital camera, and includes, the imaging device 10, an imaging lens 110, a memory 120, a control part 130, a storage medium 140, a monitor 150 and an operation part 160. The imaging lens 110 images a subject image on a light-receiving surface of the imaging device 10.

The memory 120 is a built-in memory formed by, for example, a DRAM (Dynamic RAM), an SRAM (Static RAM) and so on, and temporary stores image data of images photographed by the imaging device 10 and so on. The control part 130 is, for example, a microprocessor, and controls the operations of the imaging device 10, operations of the imaging lens 110, and so on based on not-illustrated programs.

The storage medium 140 stores image data of the photographed images and so on. The monitor 150 is, for example, a liquid crystal display, and displays the photographed images, the images stored at the memory 120, the images and menu screens stored at the storage medium 140, and so on. The operation part 160 includes a release button, and other various switches, and is operated by a user to operate the camera 100.

Hereinabove, the dummy resets are performed for arbitrary rows of which read operations end in accordance with the increase and decrease in the number of rows of the pixel resets for the pixels PX before exposure, and the number of rows of the pixel resets performed during the read operation period of each row is made constant in this embodiment. It is thereby possible to prevent that the number of rows to which the pixel resets are performed varies in the middle of the read period TRD in this embodiment. Namely, it is possible to prevent that the power supply voltage varies in the middle of the read period TRD and that the noise is generated caused by the power supply voltage variation in this embodiment. As a result, it is possible to prevent the generation of noise caused by the power supply voltage variation, and to suppress the electronic shutter defect in this embodiment. Namely, the deterioration of the image quality of the photographed image can be suppressed in this embodiment.

Figure 7:
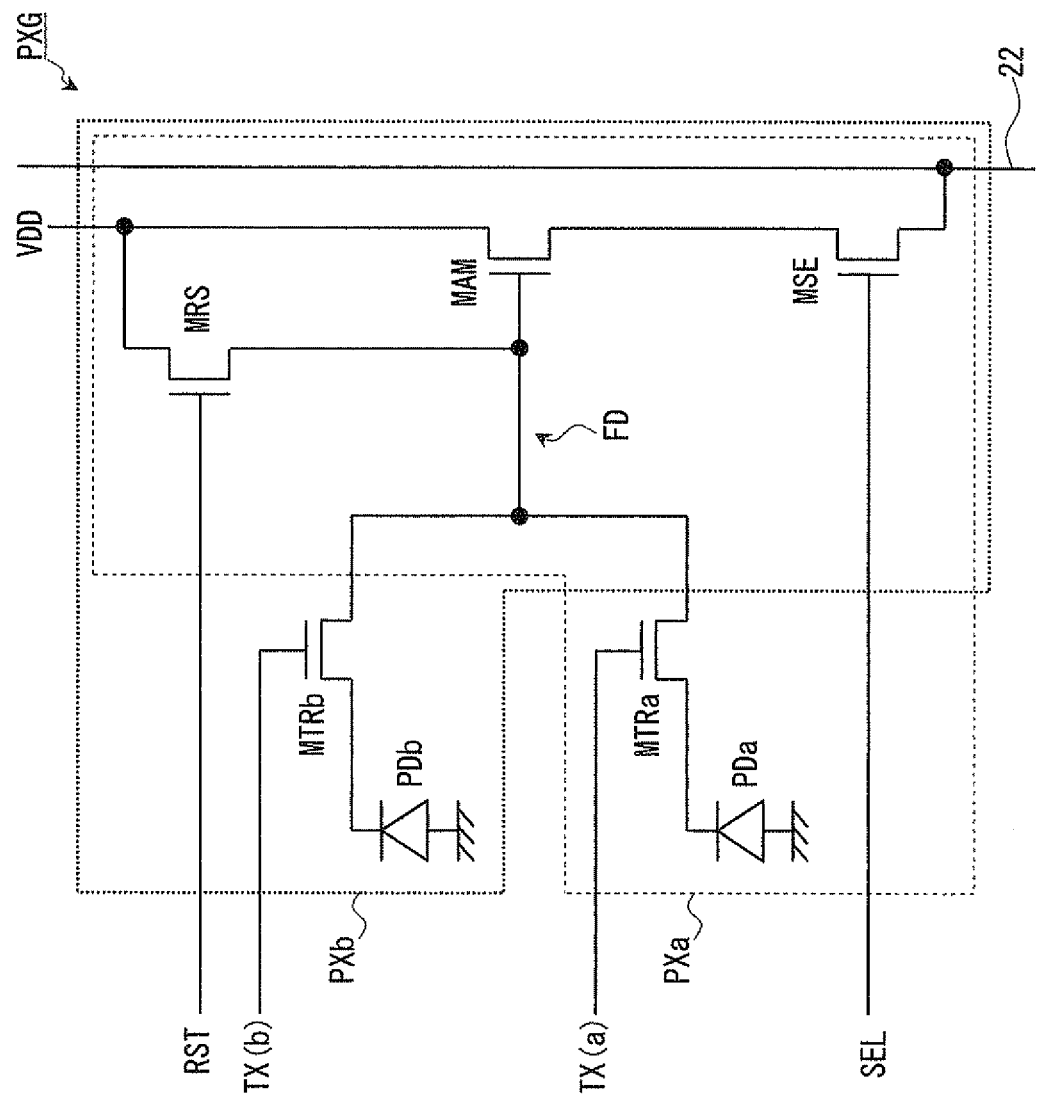
FIG. 7 is a view illustrating an example of a pixel of an imaging device in another embodiment.

FIG. 7 illustrates an example of a pixel PX of the imaging device 10 in another embodiment. The same reference numerals and symbols are used to designate the same elements as the elements described in FIG. 1 to FIG. 6, and the detailed description is not given as for these. The pixel PX of this embodiment is the same as the above-stated FIG. 2 except that the amplifying transistor MAM, the pixel selection transistor MSE, the reset transistor MRS, and the floating diffusion FD are commonly used by two pixels PXa, PXb. Besides, the imaging device 10 of this embodiment is the same as the above-stated embodiment except that the floating diffusion FD and so on are commonly used by the two pixels PXa, PXb.

A pixel group PXG includes the two pixels PXa, PXb which are, for example, adjacent in a column direction (a vertical direction in FIG. 7). The pixel PXa includes a photodiode PDa, a transfer transistor MTRa, the amplifying transistor MAM, the pixel selection transistor MSE, the reset transistor MRS, and the floating diffusion FD. Besides, the pixel PXb includes a photodiode PDb, a transfer transistor MTRb, the amplifying transistor MAM, the pixel selection transistor MSE, the reset transistor MRS, and the floating diffusion FD.

Note that the photodiodes PD (PDa, PDb) and the transfer transistors MTR (MTRa, MTRb) are provided by every pixels PX (PXa, PXb) making up the pixel group PXG. The amplifying transistor MAM, the pixel selection transistor MSE, the reset transistor MRS, and the floating diffusion FD are commonly used by the two pixels PX (PXa, PXb) making up the pixel group PXG. For example, drains of the transfer transistors MTRa, MTRb are commonly coupled to a gate of the amplifying transistor MAM.

The pixel reset and the read operation for each pixel PX are basically the same as the operations illustrated in FIG. 3. For example, when the reset signal RST resets either of the pixels PXa, PXb, it is kept at high-level for a certain period. Besides, when the selection signal SEL reads a signal from either of, for example, the pixels PXa, PXb, it is kept at high-level. Note that a configuration of the pixel group PXG is not limited to this example. For example, the pixel group PXG may be made up by commonly using the amplifying transistor MAM, the pixel selection transistor MSE, the reset transistor MRS and the floating diffusion FD by three or more pixels PX.

Figure 8:
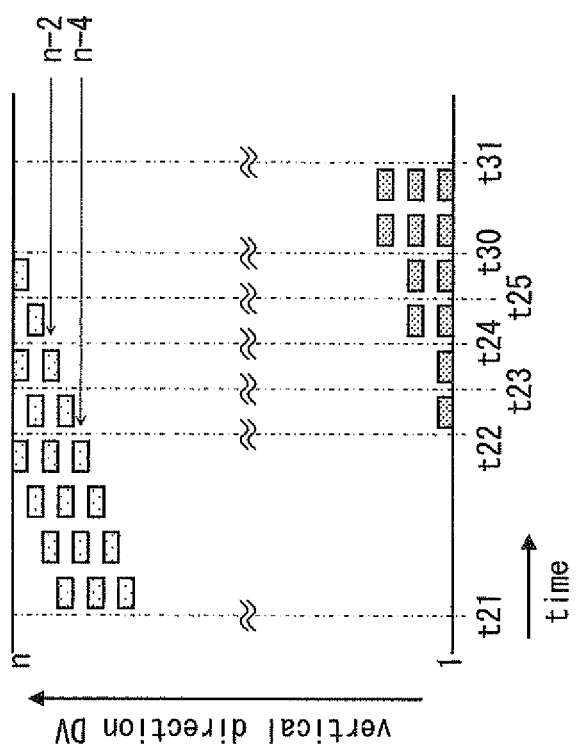
FIG. 8 is a view illustrating an example of operations of the imaging device using the pixel illustrated in FIG. 7.

FIG. 8 illustrates an example of operations of the imaging device 10 using the pixel PX illustrated in FIG. 7. Note that FIG. 8 illustrates a summary of the pixel resets when signals are read from the pixels PX at all rows. Besides, FIG. 8 corresponds to the enlarged view from the time t21 to the time t31 illustrated in FIG. 4, and the description of the read operation is not given for easy to see the drawing. For example, the read operations are sequentially performed from the first row to the n-th row during the read period TRD illustrated in FIG. 4. A relatively pale half-tone dot meshing in the drawing represents the pixel reset for the pixel PX before exposure, and a relatively deep half-tone dot meshing represents the dummy reset.

In the operations illustrated in FIG. 8, for example, the pixel resets for three times are performed for the pixel PX before exposure to surely reset the pixel PX. Accordingly, the pixel resets for the pixels PX before exposure are performed every three rows until before the time t22 (for example, until the first pixel reset is performed for the pixel PX at the n-th row) within the read period (the read period TRD illustrated in FIG. 4). Note that the pixel resets are performed for three rows on every other row in this embodiment because the floating diffusion FD and so on are commonly used by the two pixels PXa, PXb.

During a period from the time t22 to the time t23, the pixel resets for the pixels PX before exposure are performed for two rows at the "n−3"-th row and at the "n−1"-th row because the pixel reset for the pixel PX at the "n−4"-th row ends. Accordingly, for example, the dummy reset (pixel reset) is performed for the pixel PX at the first row of which read operation ends. The pixel resets are thereby performed for the pixels PX of three rows (the first row, the "n−3"-th row, the "n−1"-th row) during the period from the time t22 to the time t23.

During a period from the time t23 to the time t24, the pixel resets for the pixels PX before exposure are performed for two rows at the "n−2"-th row and the n-th row because the pixel reset for the pixel PX at the "n−3"-th row ends. Accordingly, for example, the dummy reset is performed for the pixel PX at the first row of which read operation ends. The pixel resets are thereby performed for the pixels PX of three rows (the first row, the "n−2"-th row, the n-th row) during the period from the time t23 to the time t24.

During a period from the time t24 to the time t25, the pixel reset for the pixel PX before exposure is performed only for the "n−1"-th row because the pixel reset for the pixel PX at the "n−2"-th row ends. Accordingly, for example, the dummy resets are performed for the pixels PX at the first and third rows of which read operations end. The pixel resets are thereby performed for the pixels PX of three rows (the first row, the third row, the "n−1"-th row) during the period from the time t24 to the time t25.

During a period from the time t25 to the time t30, the pixel reset for the pixel PX before exposure is performed only for the n-th row because the pixel reset for the pixel PX at the "n−1"-th row ends. Accordingly, for example, the dummy resets are performed for the pixels PX at the first and third rows of which read operations end. The pixel resets are thereby performed for the pixels PX of three rows (the first row, the third row, the n-th row) during the period from the time t25 to the time t30.

During a period from the time t30 to the time t31, the dummy resets are performed for, for example, the pixels PX at the first, third, and fifth rows of which read operations end because the pixel resets for the pixels PX before exposure end at all rows. The pixel resets are thereby performed for the pixels PX of three rows (the first row, the third row, the fifth row) during the period from the time t30 to the time t31. As stated above, the number of rows to which the dummy resets are performed increases in accordance with the decrease in the number of rows to which the pixel resets are performed for the pixels PX before exposure.

After the time t31, the dummy resets are performed for the pixels PX at the first, third and fifth rows until a time when the pixel reset for the second photographing is performed (for example, the time t40 in FIG. 4). After a time when the pixel reset for the second photographing is performed, the number of rows to which the dummy resets are performed decreases in accordance with the increase in the number of rows to which the pixel resets for the pixels PX before exposure are performed.

For example, when the pixel reset for the second photographing is performed for the pixel PX at the first row, the dummy resets are performed for the pixels PX of two rows (the third row, the fifth row). Besides, when the pixel reset is performed for the pixel PX at the second row, the dummy resets are performed for the pixels PX of two rows (the fourth row, the sixth row). When the pixel resets are performed for the pixels PX at the first and third rows, the dummy reset is performed for the pixel PX of one row (the fifth row). Besides, when the pixel resets are performed for the pixels PX at the second and fourth rows, the dummy reset is performed for the pixel PX of one row (the sixth row).

Note that when the second photographing is not performed continuously, the pixel resets may be performed for the pixels PX of three rows (the first row, the third row, the fifth row) from the time t30 to the time when the read operations end (for example, the time t50 illustrated in FIG. 4).

As stated above, it is possible to make the number of rows of the pixel resets performed during the read operation period of each row constant (for example, three rows) in this embodiment. Accordingly, for example, it is possible to prevent that the power supply voltage varies in the middle of the read period TRD illustrated in FIG. 4, and to prevent the generation of noise caused by the power supply voltage variation in this embodiment. Namely, it is possible to suppress the electronic shutter defect and to suppress the deterioration of the image quality of the photographed image in this embodiment. Note that the operations of the imaging device 10 are not limited to this example. For example, the dummy resets may be alternately performed at even number rows and odd number rows in accordance with the pixel resets for the pixels PX before exposure.

Figure 9:
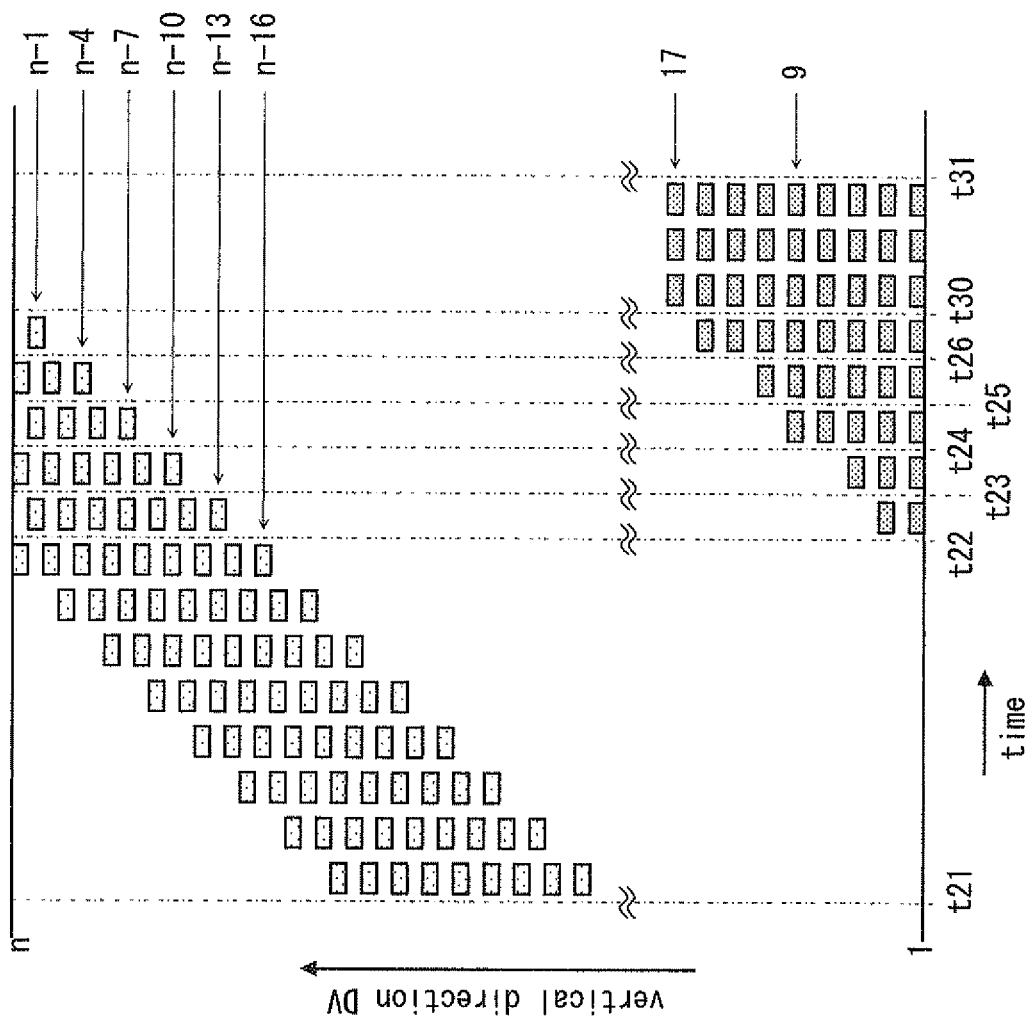
FIG. 9 is a view illustrating another example of the operations of the imaging device using the pixel illustrated in FIG. 7.

FIG. 9 illustrates another example of operations of the imaging device 10 using the pixel PX illustrated in FIG. 7. Note that FIG. 9 illustrates a summary of the pixel resets when the 1/3 thinning-out reading is performed. Besides, FIG. 9 corresponds to the enlarged view from the time t21 to the time t31 illustrated in FIG. 4, and the description of the read operation is not give for easy to see the drawing. For example, in the 1/3 thinning-out reading, a signal is read from a pixel PX at the "3×i–"-th row (i=1, 2, 3, . . . ). A relatively pale half-tone dot meshing in the drawing represents the pixel reset for the pixel PX before exposure, and a relatively deep half-tone dot meshing represents the dummy reset. The pixel reset is also performed for a row adjacent to the read object row in this embodiment. It is thereby possible to prevent that the signal charge of the pixel PX at a skipped row leaks into the pixel PX at a row to be read (blooming) in this embodiment.

In the operations illustrated in FIG. 9, for example, the pixel resets are performed for three times for the pixel PX before exposure to surely reset the pixel PX. Accordingly, the pixel resets for the pixels PX before exposure are performed for the three rows being the read objects and six rows which are skipped. For example, the pixel resets for the pixels PX before exposure are performed every nine rows until before the time t22 (for example, until the first pixel reset for the pixel PX at the n-th row is performed) within the read period (the read period TRD illustrated in FIG. 4). Note that the floating diffusion FD and so on are commonly used by the two pixels PXa, PXb in this embodiment, and therefore, the pixel resets are performed for nine rows on every other row. The object rows of the pixel resets for the pixels PX before exposure sequentially shift every three rows.

During a period from the time t22 to the time t23, the pixel reset for the pixel PX at the "n–15"-th row ends, and therefore, the pixel resets for the pixels PX before exposure are performed for seven rows on every other row from the "n–13"-th row to the "n–1"-th row. Accordingly, for example, the dummy resets (pixel resets) are performed for the pixels PX at the first and third rows of which read operations end. The pixel resets are performed for the pixels PX of nine rows (the first row, the third row, the "n–j"-th row (j=1, 3, 5, 7, 9, 11, 13)) during the period from the time t22 to the time t23.

During a period from the time t23 to the time t24, the pixel reset for the pixel PX at the "n–12"-th row ends, and therefore, the pixel resets for the pixels PX before exposure are performed for six rows on every other row from the "n–10"-th row to the n-th row. Accordingly, for example, the dummy resets are performed for the pixels PX at the first, third and fifth rows of which read operations end. The pixel resets are thereby performed for the pixels PX of nine rows (the first row, the third row, the fifth row, the "n–j"-th row (j=0, 2, 4, 6, 8, 10)) during the period from the time t23 to the time t24.

During a period from the time t24 to the time t25, the pixel reset for the pixel PX at the "n–9"-th row ends, and therefore, the pixel resets for the pixels PX before exposure are performed for four rows of the "n–7"-th row, the "n–5"-th row, the "n–3"-th row, the "n–1"-th row. Accordingly, for example, the dummy resets are performed for the pixels PX at the first, third, fifth, seventh and ninth rows of which read operations end. The pixel resets are thereby performed for the pixels PX of nine rows (the first row, the third row, the fifth row, the seventh row, the ninth row, the "n–j"-th row (j=1, 3, 5, 7)) during the period from the time t24 to the time t25.

During a period from the time t25 to the time t26, the pixel reset for the pixel PX at the "n–6"-th row ends, and therefore, the pixel resets for the pixels PX before exposure are performed for three rows of the "n–4"-th row, the "n–2"-th row, the n-th row. Accordingly, for example, the dummy resets are performed for the pixels PX at the first, third, fifth, seventh, ninth and eleventh rows of which read operations end. The pixel resets are thereby performed for the pixels PX of nine rows (the first row, the third row, the fifth row, the seventh row, the ninth row, the eleventh row, the "n–4"-th row, the "n–2"-th row, the n-th row) during the period from the time t25 to the time t26.

During a period from the time t26 to the time t30, the pixel reset for the pixel PX at the "n–3"-th row ends, and therefore, the pixel reset for the pixel PX before exposure is performed only for the "n–1"-th row. Accordingly, for example, the dummy resets are performed for the pixels PX at the first, third, fifth, seventh, ninth, eleventh, thirteenth and fifteenth rows of which read operations end. The pixel resets are thereby performed for the pixels PX of nine rows (the first row, the third row, the fifth row, the seventh row, the ninth row, the eleventh row, the thirteenth row, the fifteenth row, the "n–1"-th row) during the period from the time t26 to the time t30.

During a period from the time t30 to the time t31, the dummy resets are performed for the pixels PX of nine rows on every other row from the first row to the seventeenth row of which read operations end because the pixel resets for the pixels PX before exposure end at all rows. The pixel resets are thereby performed for the pixels PX of nine rows (the first row, the third row, the fifth row, the seventh row, the ninth row, the eleventh row, the thirteenth row, the fifteenth row, the seventeenth row) during the period from the time t30 to the time t31. As stated above, the number of rows to which the dummy resets are performed increases in accordance with the decrease in the number of rows to which the pixel resets for the pixels PX before exposure are performed.

After the time t31, the dummy resets are performed for the pixels PX of nine rows which are the same as the period from the time t30 to the time t31 until the time when the pixel reset for the second photographing is performed (for example, the time t40 in FIG. 4). After the time when the pixel reset for the second photographing is performed, the number of rows to which the dummy resets are performed decreases in accordance with the increase in the number of rows to which the pixel resets for the pixels PX before exposure are performed. It is thereby possible to make the number of rows of the pixel resets performed during the read operation period of each row constant (for example, nine rows) in this embodiment.

For example, when the pixel resets for the second photographing are performed for the pixels PX at the first, third and fifth rows, the dummy resets are performed for the pixels PX of six rows (odd number rows from the seventh row to the seventeenth row). When the pixel resets are performed for the pixels PX at the second, fourth and sixth rows, the dummy resets are performed for the pixels PX of six rows (even number rows from the eighth row to the eighteenth row).

Note that when the second photographing is not performed continuously, the pixel resets may be performed for the pixels PX of nine rows (the nine rows which are the same as the period from the time t30 to the time t31) from the time t30 to the time when the read operations end (for example, the time t50 illustrated in FIG. 4). It is thereby possible to make the number of rows of the pixel resets performed during the read operation period of each row constant (for example, nine rows) in this embodiment.

Namely, it is possible to make the number of rows of the pixel resets performed during the read operation period of each row constant (for example, nine rows) even when the thinning-out reading is performed in this embodiment. Note that the operations of the imaging device 10 are not limited to this example. For example, the dummy resets may be alternately performed at the even number rows and the odd number rows in accordance with the pixel resets for the pixels PX before exposure.

Here, the control of the dummy reset at the time of the vertical three pixel mixing and the control of the pixel reset for the pixel PX before exposure are the same as FIG. 9. Besides, the control of the dummy reset and the control of the pixel reset for the pixel PX before exposure are basically the same as FIG. 9 except the numbers of rows of the pixel resets simultaneously performed even when a thinning-out reading and so on other than the 1/3 thinning-out reading is performed. Note that in the thinning-out reading, the pixel reset may be performed only for the read object row and the row adjacent to the read object row, or may be performed for all rows. As stated above, the similar effect as the above-stated embodiment can be obtained also in this embodiment.

Note that the example in which the pixel resets for the pixel PX before exposure are performed for three times is described in the above-stated embodiment. The present invention is not limited to the embodiment. For example, the pixel resets for the pixel PX before exposure may be performed for four times or more. Otherwise, the number of pixel resets performed for the pixel PX before exposure may be once or twice. Namely, the number of pixel resets performed for the pixel PX before exposure may be set in accordance with a capacitance and so on of the photodiode PD of the pixel PX. The similar effect as the above-stated embodiment can be obtained also in this case.

In the above-stated embodiment, the example in which the dummy reset is performed for the pixel PX at the optical black region OB is described. The present invention is not limited to the embodiment. For example, the dummy reset is to be performed for the rows of which read operations end, and it may be performed for the rows at other than the optical black region OB. Besides, for example, the rows to which the dummy resets are performed may be sequentially selected from the row from which the signal is first read, or may be selected from intermediate rows of which signal reading is not the first. The similar effect as the above-stated embodiment can be obtained also in this case.

In the above-stated embodiment, the example of the vertical scanning circuit 30 selecting a drive object row such as the pixel reset by the decoder DEC is described. The present invention is not limited to the embodiment. For example, the vertical scanning circuit 30 may select the drive object row such as the pixel reset by using a shift register. The similar effect as the above-stated embodiment can be obtained also in this case.

Figure 10:
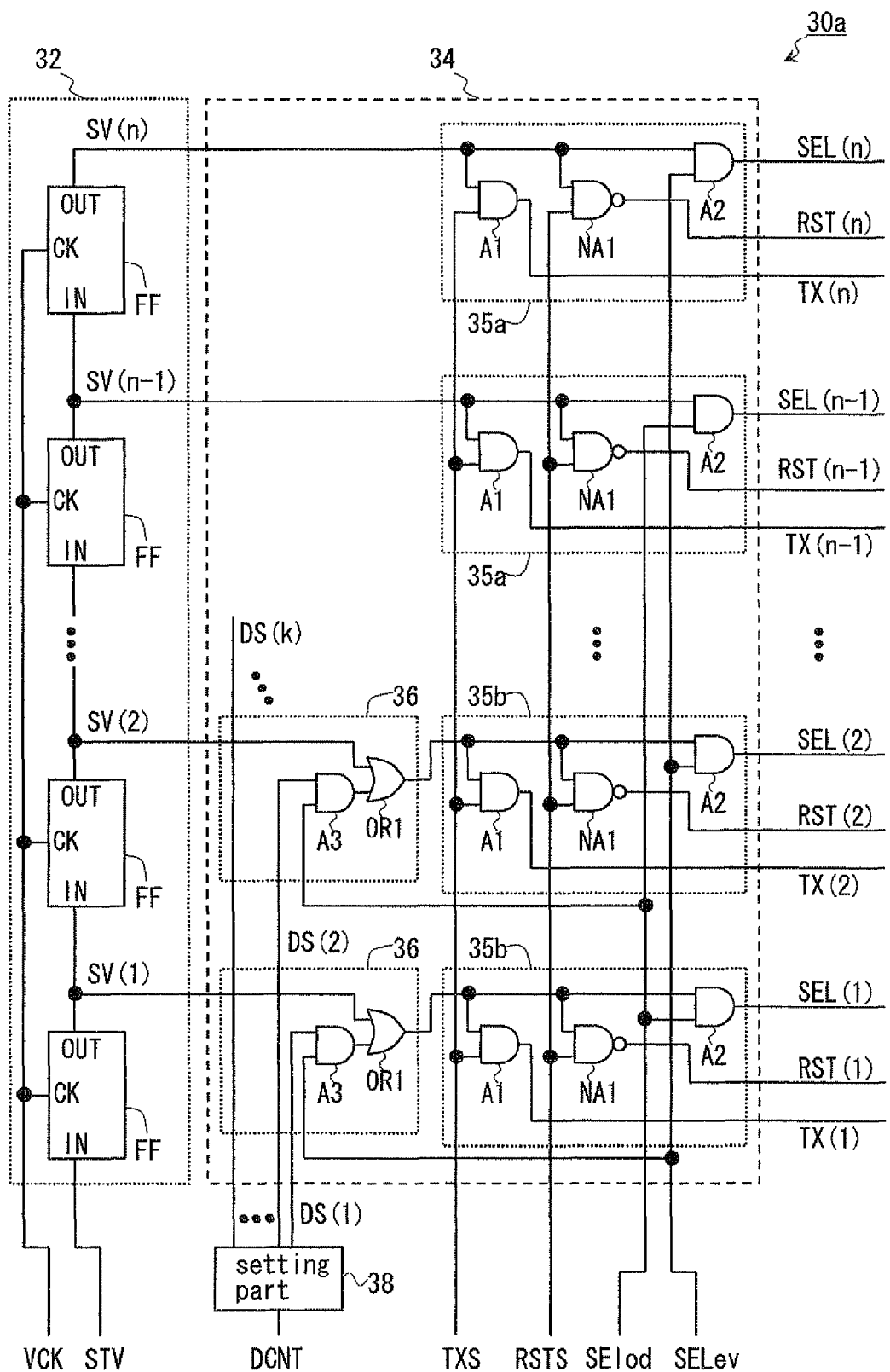
FIG. 10 is a view illustrating another example of a vertical scanning circuit illustrated in FIG. 1.

FIG. 10 illustrates another example of the vertical scanning circuit 30 illustrated in FIG. 1. Note that FIG. 10 illustrates an example of a vertical scanning circuit 30a made up by including a shift register. The vertical scanning circuit 30a includes, for example, a vertical shift register 32, a vertical driving circuit 34 and a setting part 38, and selects object rows of the pixel reset and the read operation by using the vertical shift register 32. Note that a driving clock VCK, a vertical start signal STV, a control signal DCNT, and control signals SELod, SELev, RSTS, TXS received by the vertical scanning circuit 30a are generated by, for example, the timing generator 40 illustrated in FIG. 1.

The vertical shift register 32 includes n-stages of flip-flop circuits FF which are cascade coupled. The flip-flop circuit FF is, for example, a D-type flip-flop circuit in static type, and is driven by the driving clock VCK input to a clock input part CK. Note that the flip-flop circuit FF may include two or more clock input parts CK. Besides, the flip-flop circuit FF may be a D-type flip-flop circuit in dynamic type, or many be a circuit other than the D-type flip-flop circuit.

The vertical start signal STV is input to a data input part IN of the first-stage flip-flop. circuit FF. Each of data input parts IN of the flip-flop circuits FF at the second-stage and later is coupled to a data output part OUT of the flip-flop circuit FF at a previous stage. Further, a signal output from the data output part OUT of the flip-flop circuit FF at each stage is input to the vertical driving circuit 34 as a vertical shift pulse SV corresponding to each row of the pixel array 20. Accordingly, a level of the vertical shift pulse SV shifts to a subsequent stage by, for example, each rising of the driving clock VCK.

The vertical driving circuit 34 includes n-pieces of unit circuits 35 (35a, 35b) provided by each row of the pixel array 20 and k-pieces of unit circuits 36 provided by each row corresponding to the dummy reset. Note that the unit circuit 35a is the unit circuit 35 corresponding to a row to which the dummy reset is not performed, and the unit circuit 35b is the unit circuit 35 corresponding to a row which corresponds to the dummy reset.

Each unit circuit 35a receives one of the selection signals SELod, SELev, the reset signal RSTS, the transfer signal TXS and the vertical shift pulse SV, and outputs the selection signal SEL, the reset signal RST and the transfer signal TX to the pixel PX at the row corresponding to the vertical shift pulse SV. Note that the selection signal SELod is input to the unit circuit 35 corresponding to the odd number row, and the selection signal SELev is input to the unit circuit 35 corresponding to the even number row. For example, each unit circuit 35a includes an AND circuit A1, an NAND circuit NA1 and an AND circuit A2.

The AND circuit A1 receives the vertical shift pulse SV and the transfer signal TXS. The AND circuit A1 outputs a logical product result between the vertical shift pulse SV and the transfer signal TXS to the pixel PX as the transfer signal TX.

The NAND circuit NA1 receives the vertical shift pulse SV and the reset signal RSTS. The NAND circuit NA1 outputs a negative logical product result between the vertical shift pulse SV and the reset signal RSTS to the pixel PX as the reset signal RST.

The AND circuit A2 receives one of the selection signals SELod, SELev and the vertical shift pulse SV. For example, the AND circuit A2 of the unit circuit 35 corresponding to the odd number row outputs a logical product result between the vertical shift pulse SV and the selection signal SELod to the pixel PX as the selection signal SEL. Note that the AND circuit A2 of the unit circuit 35 corresponding to the even number row outputs a logical product result between the vertical shift pulse SV and the selection signal SELev to the pixel PX as the selection signal SEL.

Each unit circuit 35b receives one of the selection signals SELod, SELev, the reset signal RSTS, the transfer signal TXS, the vertical shift pulse SV and an output of the unit circuit 36. Each unit circuit 35b outputs the selection signal SEL, the reset signal RST and the transfer signal TX to the pixels PX at a row corresponding to the vertical shift pulse SV and at a row selected by the unit circuit 36. Note that a configuration of the unit circuit 35b is the same as the unit circuit 35a except signals input to the AND circuits A1, A2 and the NAND circuit NA1. For example, the AND circuits A1, A2 and the NAND circuit NA1 receive the output of the unit circuit 36 instead of the vertical shift pulse SV.

Each unit circuit 36 receives one of the selection signals SELod, SELev, the vertical shift pulse SV and a control signal DS, and outputs a pulse instead of the vertical shift pulse SV to each unit circuit 35b. Note that the selection signal SELod is input to the unit circuit 36 which corresponds to the even number row, and the selection signal SELev is input to the unit circuit 36 which corresponds to the odd number row. Besides, each control signal DS is set at high-level when, for example, the dummy reset is performed. For example, the unit circuit 36 outputs high-level when the dummy reset is performed or the vertical shift pulse SV is at high-level.

Each unit circuit 36 includes, for example, an AND circuit A3 and an OR circuit OR1. The AND circuit A3 receives one of the selection signals SELod, SELev and the control signal DS. For example, the AND circuit A3 of the unit circuit 36 corresponding to the odd number row outputs a logical product result between the control signal DS and the selection signal SELev to the OR circuit OR1. Note that the AND circuit A3 of the unit circuit 36 corresponding to the even number row outputs a logical product result between the control signal DS and the selection signal SELod to the OR circuit OR1. For example, it is thereby prevented that the selection signal SEL becomes at high-level when the dummy reset is performed.

The OR circuit OR1 receives the output of the AND circuit A3 and the vertical shift pulse SV. The OR circuit OR1 outputs a logical sum result between the output of the AND circuit A3 and the vertical shift pulse SV to the unit circuit 35b (in more detail, the AND circuits A1, A2 and the NAND circuit NA1). For example, the unit circuit 36 thereby outputs the vertical shift pulse SV to the unit circuit 35 when the dummy reset is not performed. Besides, for example, the unit circuit 36 at the odd number row to which the dummy reset is performed outputs a high-level signal to the unit circuit 35 when the dummy reset is performed for the pixel PX at the odd number row. Similarly, for example, the unit circuit 36 at the even number row to which the dummy reset is performed outputs the high-level signal to the unit circuit 35 when the dummy reset is performed for the pixel PX at the even number row.

The setting part 38 receives the control signal DCNT, and outputs the control signal DS to each unit circuit 36 in accordance with the number of rows to which the dummy resets are performed. The control signal DCNT is a signal representing, for example, the number of rows to which the dummy resets are performed. For example, the setting part 38 sets control signals DS (1), DS (2) at high-level when the number of rows to which the dummy reset is performed is one row. In this configuration, the dummy resets are alternately performed between the odd number row and the even number row, and therefore, two control signals DS are selected relative to the dummy reset for one row.

As stated above, the vertical driving circuit 34 generates the control signals SEL, RST, TX to control the drive object row of the pixel reset and so on based on the vertical shift pulse SV, the control signal DS, the control signals SELod, SELev, RSTS, TXS. Note that the configuration of the vertical scanning circuit 30a made up by including the shift register is not limited to the example. For example, the vertical scanning circuit 30a may include a level shift circuit converting the control signal TX and so on into an appropriate voltage level. Otherwise, for example, the vertical scanning circuit 30a may be made up by including a circuit corresponding to the unit circuit 36 at an output side of the unit circuit 35b to correspond to the dummy reset.

FIG. 11 illustrates an example of driving timings of the imaging device 10 including the vertical scanning circuit 30a illustrated in FIG. 10. Note that FIG. 11 illustrates an example of the driving timings of the pixel PX when the photodiode PD of the pixel PX is reset for three times before exposure. Meanings of star signs and triangles in the drawing are the same as FIG. 3. Namely, the star sign in the drawing represents that the photodiode PD is reset, and the triangle represents that the signal is read from the pixel PX.

The vertical start signals STV are, for example, a reset timing pulse STV10 to control a reset timing of the photodiode PD and a read timing pulse STV20 to control a timing reading the signal from the pixel PX. A cycle of the driving clock VCK is, for example, the same as the horizontal period TH. The selection signal SELev is an inversion signal of the selection signal SELod. For example, levels of the selection signals SELev, SELod change in synchronization with a rising of the driving clock VCK. Besides, for example, the vertical driving circuit 34 receives the transfer signal TXS at high-level by each horizontal period TH. Note that the reset signal RSTS and the control signal DS are respectively kept at high-level and low-level though they are not illustrated in FIG. 11.

At first, the vertical shift register 32 receives a first reset timing pulse STV10. Note that the reset timing pulse STV10 is output such that a vertical shift pulse SV (1) generated by the reset timing pulse STV10 and the selection signal SELod are at opposite level from one another.

At the horizontal period TH1, the vertical shift register 32 changes the vertical shift pulse SV (1) from low-level to high-level at the rising of the driving clock VCK. Namely, the vertical shift pulse SV (1) in which the reset timing pulse STV10 is shifted for one stage is output from the vertical shift register 32 to the vertical driving circuit 34 at the rising of the driving clock VCK at the horizontal period TH1. Note that the vertical shift pulse SV (1) is kept at high-level until the driving clock VCK rises again.

The selection signal SEL (1) is kept at low-level because the selection signal SELod is at low-level. Besides, the reset signal RST (1) changes into low-level because both of the reset signal RSTS and the vertical shift pulse SV (1) are at high-level. The reset signal RST (1) is kept at low-level until the vertical shift pulse SV (1) becomes at low-level. Besides, the transfer signal TX (1) changes into high-level when the transfer signal TXS at high-level is input to the vertical driving circuit 34 because the vertical shift pulse SV (1) is at high-level. The transfer signal TX (1) is kept at high-level during a period when both of the transfer signal TXS and the vertical shift pulse SV (1) are at high-level.

Accordingly, the transfer transistor MTR illustrated in FIG. 2 is turned on during a period when the transfer signal TX (1) is at high-level, and transfers the signal charge stored at the photodiode PD to the floating diffusion FD in the pixel PX at the first row. The photodiode PD is thereby reset. Note that the signal charge transferred to the floating diffusion FD is not read to the vertical signal line 22 because the selection signal SEL (1) is at low-level. The signal charge of the floating diffusion FD is reset during a period when the reset signal RST (1) is at high-level.

As stated above, the photodiode PD of the pixel PX at the first row is reset at the horizontal period TH1. Note that the vertical shift pulses SV other than the vertical shift pulse SV (1) are at low-level at the horizontal period TH1, and therefore, the control signals SEL, RST, TX at other than the first row are respectively kept at low-level, high-level, and low-level. Accordingly, the floating diffusion FD is reset but the photodiode PD is not reset at each of the pixels PX other than at the first row.

As stated above, the vertical driving circuit 34 sets the selection signal SEL and the reset signal RST at low-level and outputs the transfer signal TXS at high-level to the pixel PX to reset the photodiode PD.

At the horizontal period TH2, the vertical start signal STV is kept at low-level, for example, at least until the driving clock VCK rises. Accordingly, the vertical shift register 32 changes the vertical shift pulse SV (1) from high-level to low-level and changes a vertical shift pulse SV (2) from low-level to high-level at the rising of the driving clock VCK. Namely, the vertical shift pulse SV (2) in which the reset timing pulse STV10 is shifted for two stages is output from the vertical shift register 32 to the vertical driving circuit 34 at the rising of the driving clock VCK at the horizontal period TH2.

The selection signal SEL (2) is kept at low-level because the selection signal SELev is at low-level. Note that the selection signal SELev changes from high-level to low-level at the rising of the driving clock VCK. Besides, the reset signal RST (2) changes into low-level because both of the reset signal RSTS and the vertical shift pulse SV (2) are at high-level. The reset signal RST (2) is kept at low-level until the vertical shift pulse SV (2) becomes at low-level.

Besides, the transfer signal TX (2) changes into high-level when the transfer signal TXS at high-level is input to the vertical driving circuit 34 because the vertical shift pulse SV (2) is at high-level. The transfer signal TX (2) is kept at high-level during a period when both of the transfer signal TXS and the vertical shift pulse SV (2) are at high-level. Accordingly, the photodiode PD of the pixel PX at the second row is reset at the horizontal period TH2. Note that the photodiodes PD are not reset at the pixels PX other than the second row because the vertical shift pulses SV other than the vertical shift pulse SV (2) are at low-level at the horizontal period TH2.

At a latter half of the horizontal period TH2, the vertical shift register 32 receives a second reset timing pulse STV10. The vertical shift pulse SV (1) thereby changes into high-level at the horizontal period TH3.

At the horizontal period TH3, vertical shift pulses SV (1), SV (3) change from low-level to high-level and the vertical shift pulse SV (2) changes from high-level to low-level at the rising of the driving clock VCK. Namely, the vertical shift register 32 outputs the vertical shift pulse SV (3) in which the first reset timing pulse STV10 is shifted for three stages and the vertical shift pulse SV (1) in which the second reset timing pulse STV10 is shifted for one stage to the vertical driving circuit 34 at the horizontal period TH3. The selection signals SEL (1), SEL (3) are kept at low-level because the selection signal SELod is at low-level. The reset for the second time is thereby performed for the photodiode PD of the pixel PX at the first row, and the reset for the first time is performed for the photodiode PD of the pixel PX at the third row at the horizontal period TH3.

At the horizontal period TH4, the vertical start signal STV is kept at low-level until, for example, at least the driving clock VCK rises. Accordingly, the vertical shift register 32 outputs a vertical shift pulse SV (4) in which the first reset timing pulse STV10 is shifted for four stages and the vertical shift pulse SV (2) in which the second reset timing pulse STV10 is shifted for two stages to the vertical driving circuit 34 at the horizontal period TH4.

At the horizontal period TH4, the reset for the second time is thereby performed for the photodiode PD of the pixel PX at the second row, and the reset for the first time is performed for the photodiode PD of the pixel PX at the fourth row. Note that the vertical shift register 32 receives a third reset timing pulse STV10 at a latter half of the horizontal period TH4. The vertical shift pulse SV (1) thereby changes into high-level at the horizontal period TH5.

At the horizontal period TH5, the vertical shift register 32 outputs the vertical shift pulses SV (1), SV (3) at high-level and a vertical shift pulse SV (5) at high-level which is not illustrated in FIG. 11 to the vertical driving circuit 34. Thereby, the reset for the third time is performed for the photodiode PD of the pixel PX at the first row, the reset for the second time is performed for the photodiode PD of the pixel PX at the third row, and the reset for the first time is performed for the photodiode PD of the pixel PX at the fifth row at the horizontal period TH5.

Note that the vertical shift pulse SV (1) at the horizontal period TH5 is a signal in which the third reset timing pulse STV10 is shifted for one stage. Besides, the vertical shift pulses SV (3), SV (5) at the horizontal period TH5 are signals in which the vertical shift pulses SV (2), SV (4) at the horizontal period TH4 are respectively shifted for one stage. Namely, the vertical shift pulse SV (5) at the horizontal period TH5 is a signal in which the first reset timing pulse STV10 is shifted for five stages, and the vertical shift pulse SV (3) at the horizontal period TH5 is a signal in which the second reset timing pulse STV10 is shifted for three stages.

As stated above, the three reset timing pulses STV10 sequentially shift by each horizontal period TH until they are transmitted to the flip-flop circuit FF at a final stage of the vertical shift register 32. The photodiodes PD of the pixels PX at all rows are thereby reset for three times. The vertical shift register 32 receives the read timing pulse STV20 after the exposure time TS elapses (at a latter half of the horizontal period TH7 in the drawing) since a third reset timing pulse STV10 is output. Note that the read timing pulse STV20 is output so that the exposure times TS become the horizontal periods TH at odd number times. The exposure time TS is not necessarily be a three horizontal period TH as long as the above-stated condition is satisfied.

At the horizontal period TH8, the vertical shift register 32 changes the vertical shift pulse SV (1) from low-level to high-level at the rising of the driving clock VCK. Namely, at the horizontal period TH8, the vertical shift pulse SV (1) in which the read timing pulse STV20 is shifted for one stage is output from the vertical shift register 32 to the vertical driving circuit 34 at the rising of the driving clock VCK.

Besides, at the horizontal period TH8, the vertical shift register 32 outputs a vertical shift pulse SV (4) at high-level and vertical shift pulses SV (6), SV (8) at high-level which are not illustrated in FIG. 11 to the vertical driving circuit 34. Note that the vertical shift pulses SV (4), SV (6), SV (8) are signals in which the three reset timing pulses STV10 shift respectively.

The selection signal SEL (1) changes from low-level to high-level because the selection signal SELod is at high-level. Besides, the reset signal RST (1) changes into low-level because both of the reset signal RSTS and the vertical shift pulse SV (1) are at high-level. The pixel selection transistor MSE illustrated in FIG. 2 is thereby turned on in the pixel PX at the first row. Note that the selection signal SEL (1) is kept at high-level until either one of the vertical shift pulse SV (1) or the selection signal SELod becomes at low-level.

The transfer signal TX (1) changes into high-level when the transfer signal TXS at high-level is input to the vertical driving circuit 34 because the vertical shift pulse SV (1) is at high-level. The transfer transistor MTR is thereby turned on during a period when the transfer signal TX (1) is at high-level, and transfers the signal charge stored at the photodiode PD to the floating diffusion FD in the pixel PX at the first row.

The selection signal SEL (1) is at high-level, and therefore, a signal corresponding to the signal charge transferred to the floating diffusion FD is read from the pixel PX to the vertical signal line 22. As stated above, the vertical driving circuit 34 sets the selection signal SEL and the reset signal RST at high-level and low-level respectively, and outputs the transfer signal TX at high-level to the pixel PX to read the signal from the pixel PX. Namely, the control signals for read operation are the same as the control signals for the pixel reset except that the selection signal SEL is at high-level.

Besides, a selection signal SEL (4) and selection signals SEL (6), SEL (8) which are not illustrated in FIG. 11 are kept at low-level because the selection signal SELev is at low-level. Namely, the vertical driving circuit 34 outputs the selection signal SEL at low-level, the reset signal RST at low-level, and the transfer signal TX at high-level to the pixels PX at the fourth, sixth, and eighth rows as the control signals to reset the photodiodes PD.

As stated above, the signal of the pixel PX at the first row is read to the vertical signal line 22, and the photodiodes PD of the pixels PX at the fourth, sixth and eighth rows are reset at the horizontal period TH8. Namely, the pixel resets for the pixels PX before exposure are performed every three rows on every other row until, for example, the first pixel reset is performed for the pixel PX at the n-th row within the read period from the start of the read operation of the first row to the end of the read operation of the last row.

Accordingly, for example, when the number of rows to which the pixel resets are performed for the pixels PX before exposure decreases for one row, the control signals DS (1), DS (2) illustrated in FIG. 10 are kept at high-level, and the dummy reset is performed for either the first row or the second row. For example, when the pixel reset is performed for the odd number row, the dummy reset is performed for the first row, and when the pixel reset is performed for the even number row, the dummy reset is performed for the second row. The number of rows to which the dummy resets are performed increases in accordance with the decrease in the number of rows to which the pixel resets for the pixels PX before exposure are performed.

Note that when the pixel reset for the next photographing is performed in a middle of the read period, for example, the control signals DS respectively corresponding to from the first row to the sixth row are kept at high-level until, for example, the pixel reset for the sixth row is performed. It is thereby possible to make the number of rows of the pixel resets performed during the read operation of each row constant (for example, three rows) even when the pixel reset for the next photographing is performed in the middle of the read period. It is therefore possible to obtain the similar effect as the above-stated embodiment also in the configuration illustrated in FIG. 10.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An imaging device, comprising:
   a pixel array in which pixels each including a photoelectric conversion part generating and storing a signal charge in accordance with incident light are disposed in a two-dimensional matrix state; and
   a vertical scanning circuit performing a reset operation of the photoelectric conversion part by each pixel row, being selected and performing a read operation of a signal in accordance with the signal change stored in the photoelectric conversion part by each pixel row to which the rest operation is performed, wherein
   the vertical scanning circuit performs the reset operation by selecting an arbitrary pixel row of which performing of the read operation ends in accordance with increase and decrease of the number of rows to which the reset operation is performed to make the number of rows to which the reset operation is performed constant in a read period of the signal.

2. The imaging device according to claim 1,
   wherein the arbitrary pixel row is a pixel row disposed at an optical black region.

3. The imaging device according to claim 2,
   wherein the arbitrary pixel row is sequentially selected from a row of which signal is first read in the read period of the signal.

* * * * *